United States Patent
Takeuchi

(10) Patent No.: US 11,185,993 B2
(45) Date of Patent: Nov. 30, 2021

(54) ROBOT CONTROL DEVICE AND ROBOT SYSTEM

(71) Applicant: Seiko Epson Corporation, Tokyo (JP)

(72) Inventor: Kaoru Takeuchi, Azumino (JP)

(73) Assignee: Seiko Epson Corporation

(*) Notice: Subject to any disclaimer, the term of this patent is extended or adjusted under 35 U.S.C. 154(b) by 292 days.

(21) Appl. No.: 16/278,455

(22) Filed: Feb. 18, 2019

(65) Prior Publication Data

US 2019/0255712 A1   Aug. 22, 2019

(30) Foreign Application Priority Data

Feb. 19, 2018   (JP) .............................. JP2018-026570

(51) Int. Cl.
  *G05B 19/18*    (2006.01)
  *B25J 13/06*    (2006.01)
  *B25J 9/16*     (2006.01)
  *B25J 13/08*    (2006.01)

(52) U.S. Cl.
  CPC ............... *B25J 13/06* (2013.01); *B25J 9/163* (2013.01); *B25J 9/1694* (2013.01); *B25J 13/085* (2013.01); *G05B 2219/39001* (2013.01)

(58) Field of Classification Search
  CPC ........ B25J 9/1661; B25J 9/161; B25J 9/1633; B25J 9/1605; B25J 13/06; B25J 9/163; B25J 13/085; B25J 9/1694; B25J 9/1656; B25J 13/08; B25J 9/0081; B25J 9/16; B25J 9/1658; B25J 9/1687; G06F 3/0482; G05B 2219/39319; G05B 19/409; G05B 2219/39001; G05B 19/02; G05B 19/425; G05B 2219/36489

USPC .................................................. 700/245, 253
See application file for complete search history.

(56) References Cited

U.S. PATENT DOCUMENTS

| | | | |
|---|---|---|---|
| 2001/0040439 A1* | 11/2001 | Kato ...................... | G05D 15/01 318/432 |
| 2007/0210740 A1* | 9/2007 | Sato ...................... | B25J 9/1633 318/646 |
| 2008/0188985 A1* | 8/2008 | Sakano .................. | B25J 9/1648 700/260 |

(Continued)

FOREIGN PATENT DOCUMENTS

JP      02-247705 A    10/1990

*Primary Examiner* — B M M Hannan
(74) *Attorney, Agent, or Firm* — Harness, Dickey & Pierce, P.L.C.

(57) ABSTRACT

The control device for controlling a robot having a force detector includes an input device, a display, a memory, and a processor. The processor executes a program to repeat receiving of an input via the input device, selecting of an object of operation objects based on the input, and displaying of the selected object a predetermined number of times to complete an object operation flow. The processor converts the completed object operation flow into a control program for controlling the operations of the robot. The display displays a selection for selecting whether an integrator is applied to a difference between time series target force and time series measuring force for a specific control direction. The processor receives an adjusting input via the input device for adjusting an integral gain of the integrator when a result of the execution of the control program is in a predetermined condition.

20 Claims, 16 Drawing Sheets

(56) References Cited

U.S. PATENT DOCUMENTS

| | | | |
|---|---|---|---|
| 2014/0188281 A1* | 7/2014 | Nagai | B25J 9/0081 |
| | | | 700/264 |
| 2016/0136815 A1* | 5/2016 | Linnell | G05B 19/41865 |
| | | | 700/255 |
| 2016/0354925 A1* | 12/2016 | Shimodaira | B25J 9/1664 |
| 2017/0028565 A1* | 2/2017 | Matsudaira | B25J 19/06 |
| 2018/0210434 A1* | 7/2018 | Iwatake | B25J 13/085 |

* cited by examiner

FIG. 7

| CATEGORY | OBJECT | SUMMARY |
|---|---|---|
| CONTACTING | 1. CONTACTING | MOVE IN DESIGNATED DIRECTION AND STOP WHEN RECEIVING REACTION FORCE |
| | 2. RELAXED | COPY FORCE OF DESIGNATED AXIS TO BE ZERO |
| COPYING | 3. COPYING AND MOVING | MOVE DESIGNATED TRAJECTORY WHILE COPYING FORCE OF DESIGNATED AXIS TO BE ZERO |
| | 4. SURFACE MATCHING | PRESS WHILE COPYING ANGLE IN DESIGNATED DIRECTION AND MATCH SURFACE TO SURFACE |
| PROBING | 5. PRESSING AND PROBING | FIND HOLE BY PRESSING AND PROBING IN DESIGNATED TRAJECTORY |
| | 6. CONTACTING AND PROBING | FIND HOLE BY REPEATING CONTACTING OPERATION |
| PRESSING | 7. PRESSING | PRESS WITH DESIGNATED FORCE IN DESIGNATED DIRECTION (DESIGNATED AXIS INCLUDES "COPYING") |
| | 8. PRESSING AND MOVING | MOVE WHILE PRESSING WITH DESIGNATED FORCE IN DESIGNATED DIRECTION (DESIGNATED AXIS INCLUDES "COPYING") |

ROBOT CONTROL DEVICE AND ROBOT SYSTEM

BACKGROUND

1. Technical Field

The present invention relates to a robot control device and a robot system.

2. Related Art

In a robot with a teaching playback robot system, a control program (job) representing work of a robot is created based on taught results. A teaching playback robot system means a system for operating a robot by executing a control program created by teaching. The procedure of creating the control program is called "teaching", and various teaching methods have been devised in the related art. JP-A-02-247705 discloses a technology for displaying guidance information for setting parameters for operations of a robot on a screen of a teaching device in order to create a control program for a robot that executes force control using a force detector. A teacher (operator) can perform teaching by setting parameters according to the guidance information.

The force control is known as a type of robot control method. In the force control, an operation of a robot arm is controlled by utilizing the feedback from the force detector so as to realize the desired force. JP-A-02-247705 discloses a robot force control technology of using a force sensor. In the related art, a configuration in which an integrator is applied to a difference between a target force and a measuring force to eliminate the steady-state deviation is disclosed.

The application of the integrator to the difference between the target force and the measuring force eliminates the steady-state deviation, but affects the responsiveness. However, even in a case where a user wants to prioritize the responsiveness, the user was unable to select whether to give priority to the elimination of steady-state deviation or the responsiveness of the robot.

SUMMARY

An advantage of some aspects of the invention is to solve the problems described above, and the invention can be implemented as the following aspects.

(1) According to a first aspect of the invention, a robot control device that creates a control program for work of a robot with a force detector is provided. The robot control device includes a display control unit that displays an input screen including an operation flow creation area for creating an operation flow of work on a display device; a conversion unit that converts the operation flow created in the operation flow creation area into the control program; and a control execution unit that executes the control program to control the robot. The display control unit is configured to display, as the input screen, a first screen area for setting whether or not to apply an integrator to a difference between a target force and a measuring force of the force detector for a specific control direction among a plurality of control directions and a second screen area for adjusting an integral gain of the integrator.

(2) In the robot control device, the display control unit may be configured to independently set whether or not to apply the integrator for the plurality of control directions.

(3) In the robot control device, in a case where the integrator is applied, the control execution unit may be configured to include a subtractor which obtains the difference by subtracting the measuring force from the target force, the integrator into which the difference is input, an adder which adds the difference and an output of the integrator, and a force controller into which the output of the adder is input.

(4) In the robot control device, the display control unit may execute the created control program and issue an execution instruction to operate the robot, and, when the robot is operated by executing the control program created in a state where the integrator is not applied, in a case where a steady-state deviation between the measuring force and the target force is larger than a threshold value set in advance, the display control unit may display a dialogue box for starting the setting of the application of the integrator.

(5) In the robot control device, the display control unit may adjust a gain of a force controller so as to reduce overshoot of the measuring force for the control direction to which the integrator is applied.

The invention can be realized in various aspects other than the described above. For example, it can be realized in aspects of a computer program for realizing functions of a robot control device, a non-transitory storage medium storing the computer program, and the like.

BRIEF DESCRIPTION OF THE DRAWINGS

The invention will be described with reference to the accompanying drawings, wherein like numbers reference like elements.

FIG. 7 is an explanatory diagram showing an example of operation categories and operation objects constituting an operation flow.

DESCRIPTION OF EXEMPLARY EMBODIMENTS

Figure 1:
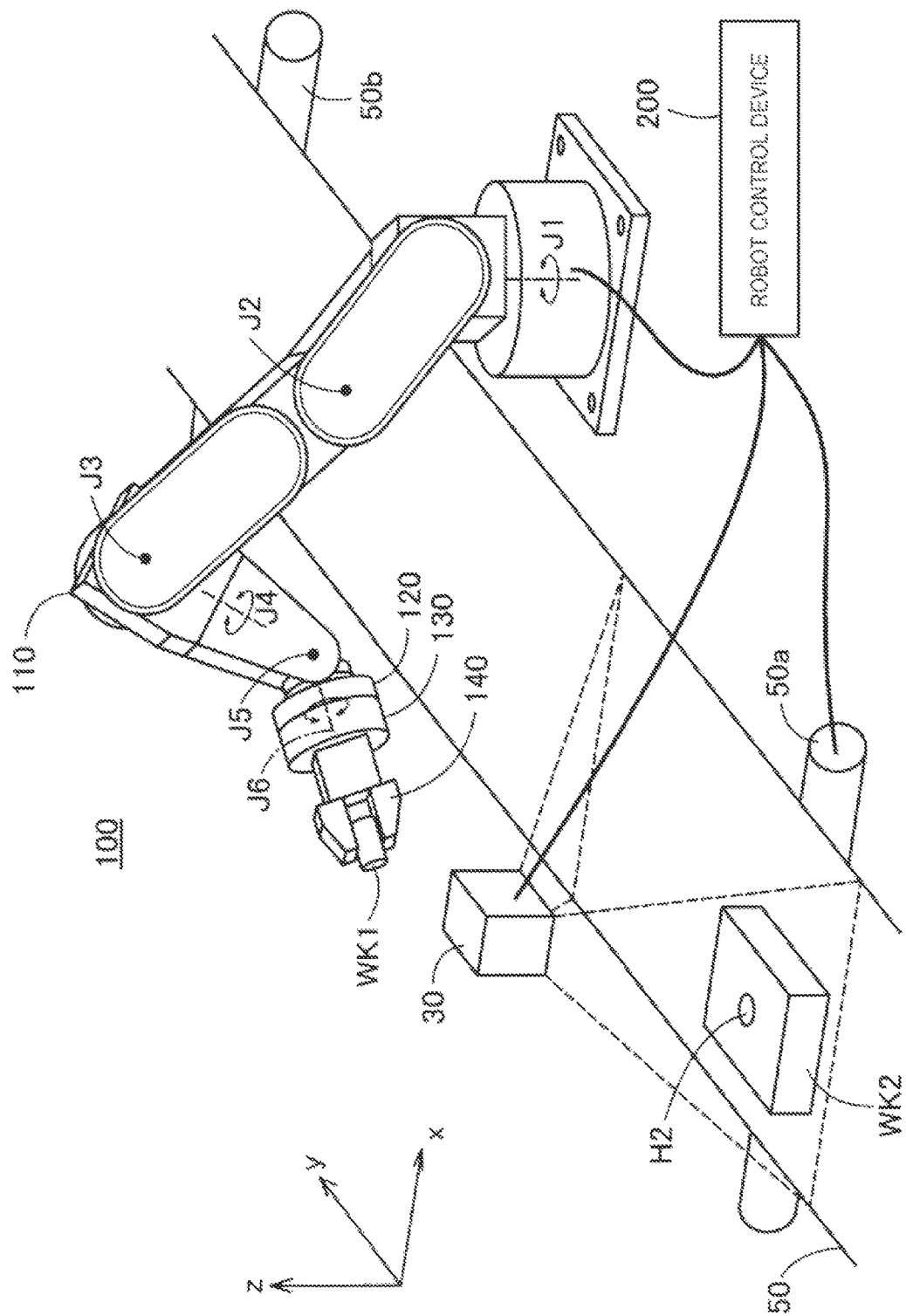
FIG. 1 is a perspective view of a robot system.

FIG. 1 is a perspective view of a robot system in an embodiment. The robot system includes a camera 30, a transport device 50, a robot 100, and a robot control device 200. The robot 100 and the robot control device 200 are communicably connected via a cable or radio.

The robot 100 is a single arm robot that is used by attaching various end effectors on an arm flange 120 at a tip end of an arm 110. The arm 110 has six joints J1 to J6. The joints J2, J3, and J5 are bending joints and the joints J1, J4, and J6 are twisting joints. Various end effectors for performing work such as gripping and processing on an object (workpiece) are installed on the arm flange 120 at the tip end of the joint J6. A point in a vicinity of the tip end of the arm 110 can be set as a tool center point (TCP).

The TCP is a position used as a reference of the positions of the end effectors, and can be set at any position. For example, a predetermined position on a rotation axis of the joint J6 can be set as the TCP. In the present embodiment, a six-axis robot is used, but a robot having another joint mechanism may be used.

The robot 100 can set the end effectors at any positions in any orientations within a movable range of the arm 110. A force detector 130 and an end effector 140 are installed on the arm flange 120. In the present embodiment, the end effector 140 is a gripper, but any other type of end effector can be used. The force detector 130 is a six-axis sensor that measures three-axis force acting on the end effector 140 and torque acting around the three axes. The force detector 130 measures magnitude of force parallel to three measurement axes orthogonal to each other in a sensor coordinate system which is a unique coordinate system, and the magnitude of torque around the three measurement axes. A force sensor as a force detector may be provided at any one or more joints J1 to J5 other than the joint J6. The force detector may only measure the force and torque in a direction of control, and a unit for directly measuring the force and torque like the force detector 130 or a unit for measuring the torque of the joint of the robot to obtain the force and the torque indirectly may be used. The force detector may measure the force and torque only in the direction of controlling force.

A coordinate system that defines a space in which the robot 100 is installed is called a robot coordinate system. A robot coordinate system is a rectangular coordinate system in three dimensions defined by an x axis and a y axis orthogonal to each other on a horizontal plane and a z axis with an upward vertical direction as a positive direction. The rotation angle around the x axis is represented by Rx, the rotation angle around the y axis is represented by Ry, and the rotation axis around the z axis is represented by Rz. Any position in the three-dimensional space can be represented by the position in the x, y, and z directions, and any orientation in the three-dimensional space can be represented by the rotation angle in the Rx, Ry, and Rz directions. Hereinafter, when expressed as "position" it may also mean position and orientation. When expressed as "force", it may also mean force and torque.

In the present embodiment, a workpiece WK2 is transported by the transport device 50. The transport device 50 includes transport rollers 50a and 50b. The transport device 50 can transport the workpiece WK2 placed on a transport surface by moving the transport surface by rotating these transport rollers 50a and 50b. The camera 30 is installed above the transport device 50. The camera 30 is installed such that the workpiece WK2 on the transport surface is in the visual field. A fitting hole H2 is formed on a surface of the workpiece WK2. The end effector 140 can perform work of fitting a workpiece WK1 gripped by the end effector 140 into the fitting hole H2 of the workpiece WK2. The fitting work may be performed in a state in which the transport surface is stopped, or, may be executed while moving the transport surface. The transport device 50 and the camera 30 can be omitted.

The robot control device 200 controls the arm 110, the end effector 140, the transport device 50, and the camera 30. The functions of the robot control device 200 are realized, for example, by a computer with a processor and a memory executing a computer program.

Figure 2A:
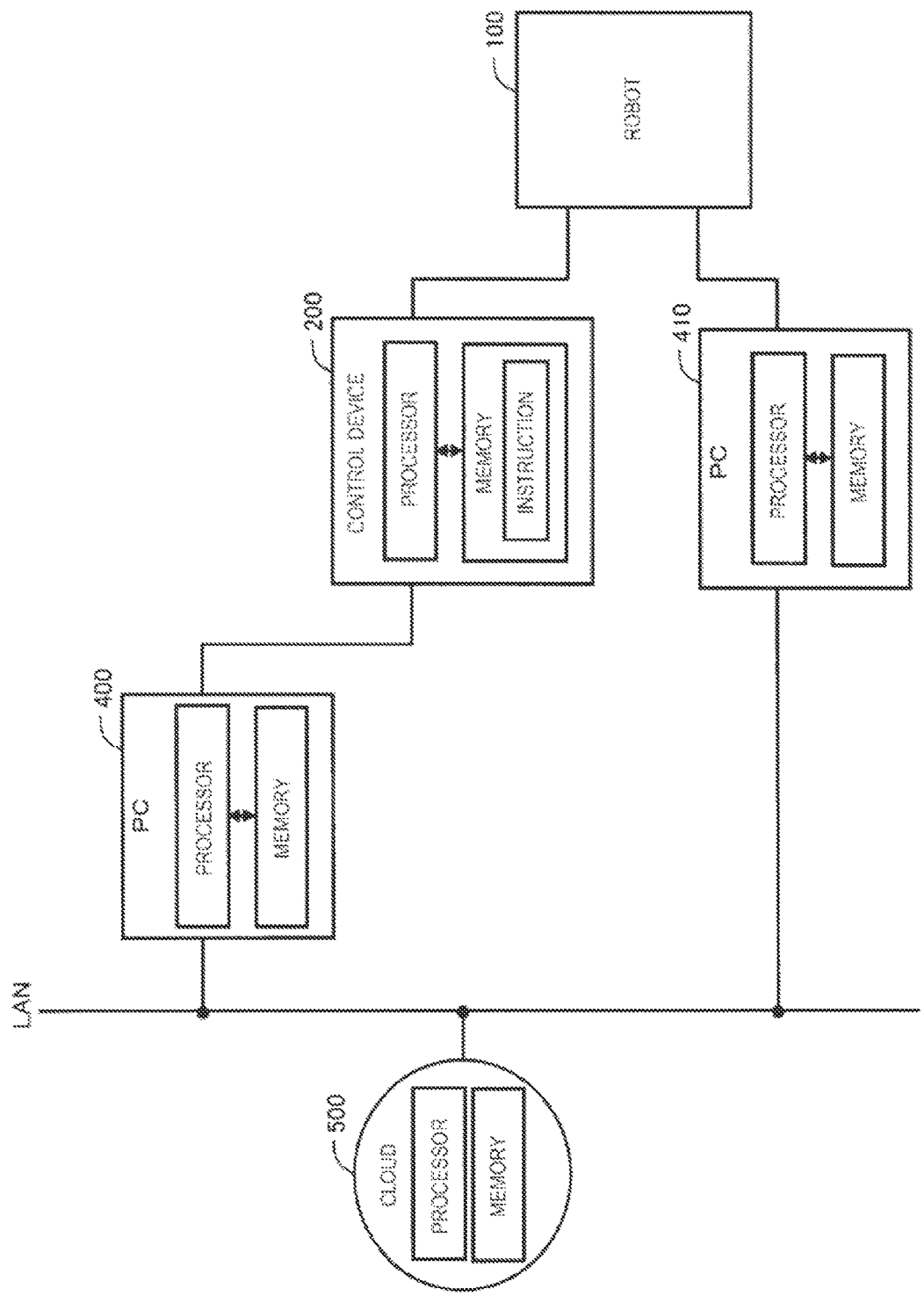
FIG. 2A is a conceptual diagram showing an example of a control device having a plurality of processors.

FIG. 2A is a conceptual diagram showing an example in which the control device of the robot is constituted by the plurality of processors. In the example, personal computers 400 and 410 and a cloud service 500 provided via a network environment such as LAN are illustrated in addition to the robot 100 and the control device 200 thereof. Each of the personal computers 400 and 410 includes a processor and a memory. A processor and a memory can be used in the cloud service 500. The control device of the robot 100 can be realized by using some or all of a plurality of these processors.

Figure 2B:
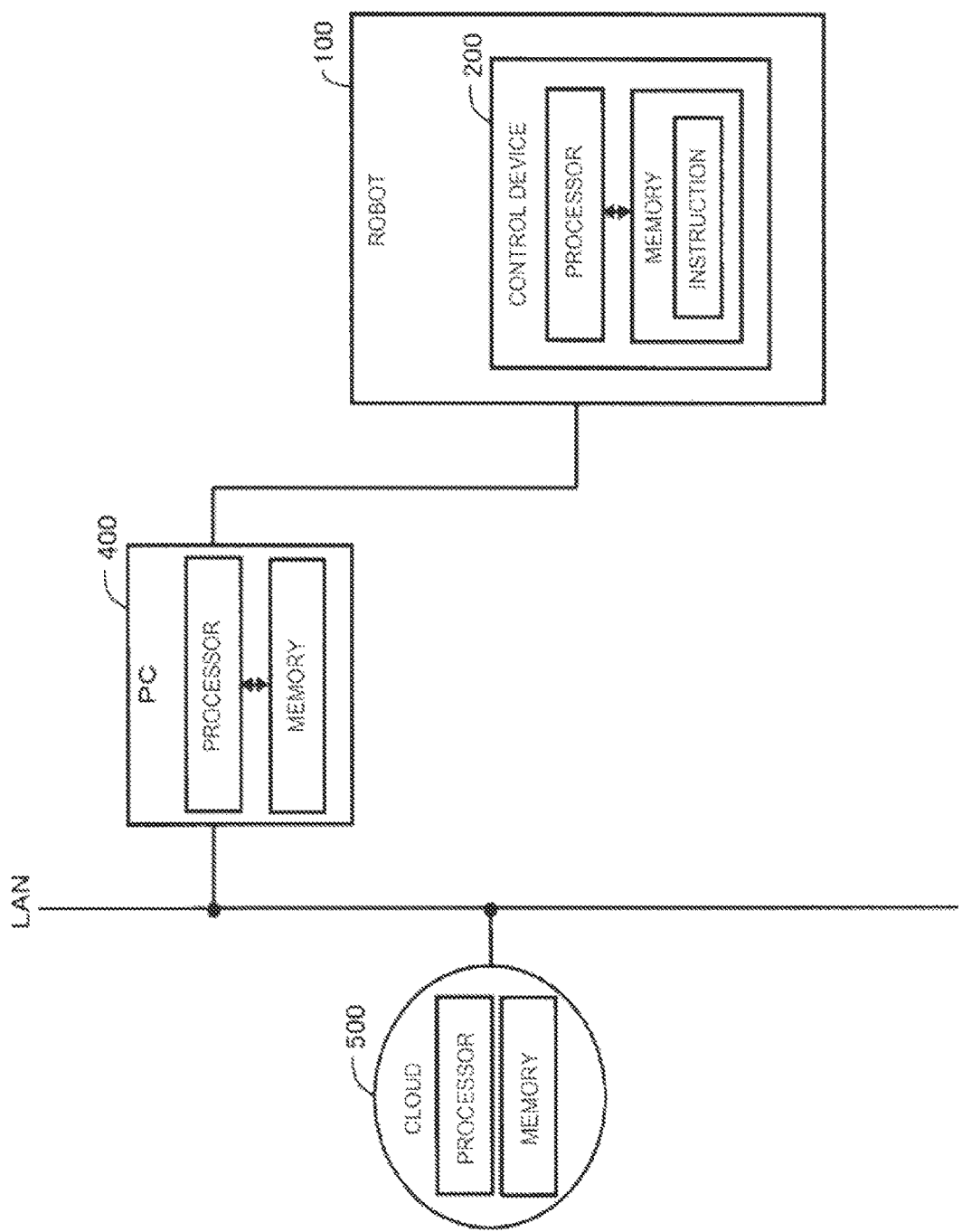
FIG. 2B is a conceptual diagram showing another example of the control device having the plurality of processors.

FIG. 2B is a conceptual diagram showing another example of a control device of a robot constituted by a plurality of processors. This example is different from FIG. 2A in that the control device 200 of the robot 100 is stored in the robot 100. The control device of the robot 100 can also be realized by using some or all of a plurality of these processors in this example.

Figure 3:
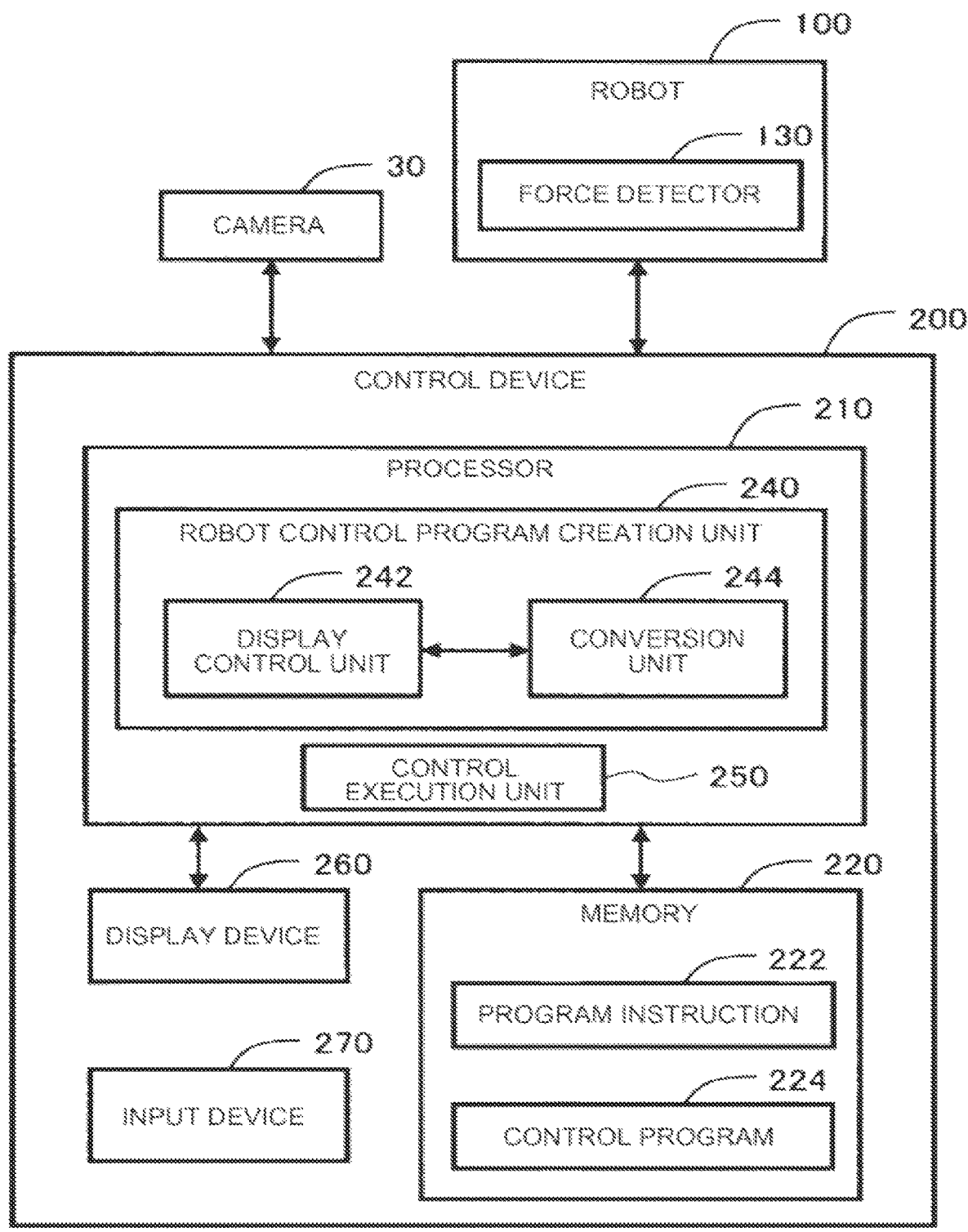
FIG. 3 is a functional block diagram of the control device.

FIG. 3 is a functional block diagram showing functions of the control device 200. The control device 200 includes a processor 210, a memory 220, a display device 260, and an input device 270. The memory 220 includes a main memory and a non-volatile memory. The processor 210 realizes functions of a robot control program creation unit 240 and a control execution unit 250 by executing a program instruction 222 stored in the memory 220 in advance. The robot control program creation unit 240 includes a display control unit 242 and a conversion unit 244. The display control unit 242 displays an input screen (described later) for creating an operation flow of work of the robot 100 on the display device 260. The conversion unit 244 converts the operation flow created in the input screen into a control program 224. The converted control program 224 is stored in the memory 220. The control program 224 may be written in a low level language such as a machine language, or, in a high level language such as a robot language. The control execution unit 250 causes the robot 100 to execute an operation of work by executing the control program 224 created as described above. The input device 270 is an input device such as a keyboard or a mouse, and the input and setting by a teacher are performed using the input device 270. Some or all of the functions of the robot control program creation unit 240 and the control execution unit 250 may be realized by a hardware circuit. The functions of the robot control program creation unit 240 will be described later.

Figure 4:
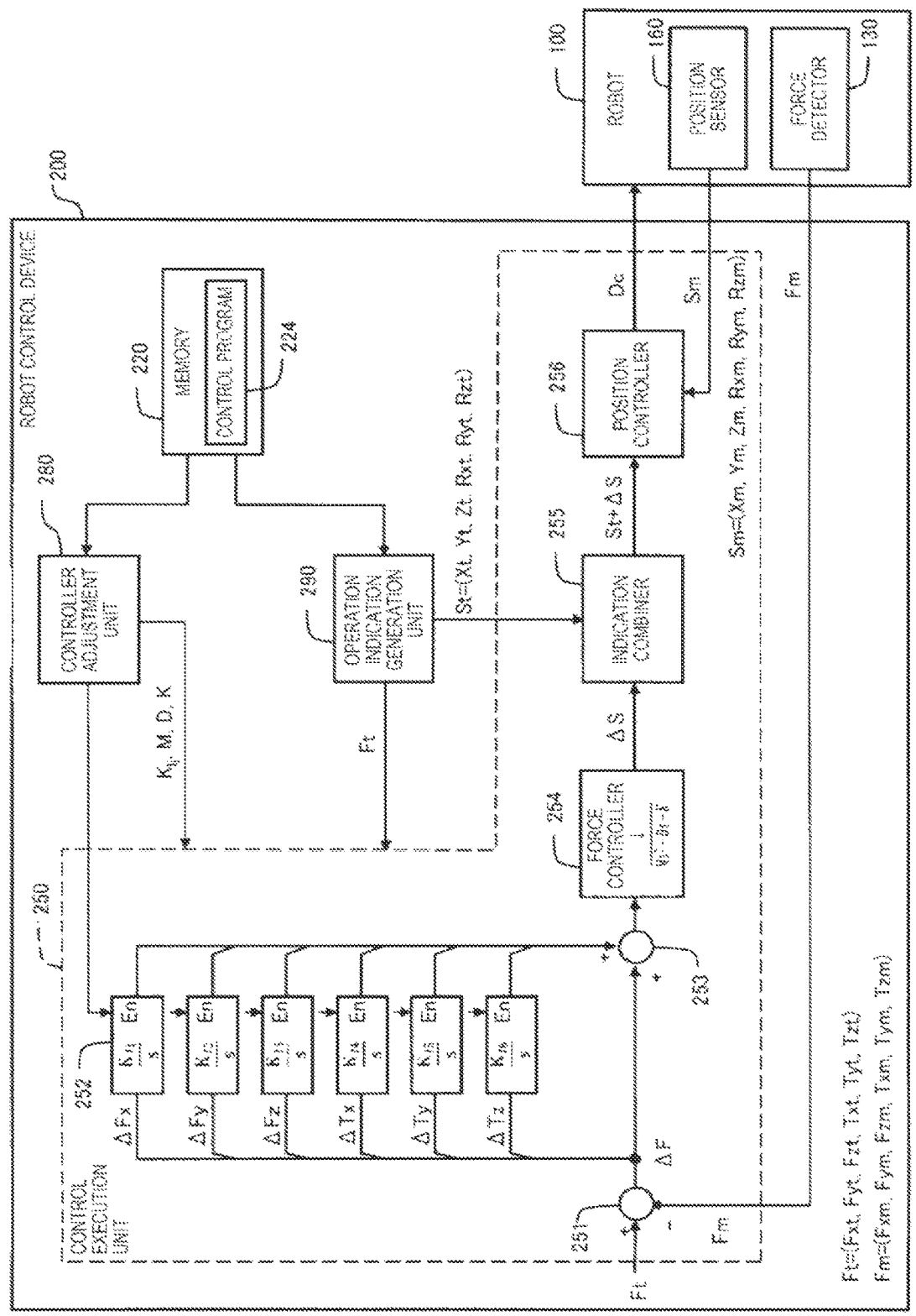
FIG. 4 is a block diagram showing a control structure of the control device.

FIG. 4 is a block diagram showing an example of a control structure of the robot control device 200. The robot control device 200 includes a controller adjustment unit 280 and an operation indication generation unit 290 in addition to the memory 220 and the control execution unit 250.

The control execution unit 250 includes a subtractor 251, an integrator 252, an adder 253, a force controller 254, an indication combiner 255, and a position controller 256. The configuration of such a control execution unit 250 is set by the control program 224 created by the robot control program creation unit 240 (FIG. 3).

The subtractor 251 subtracts a measuring force Fm measured by the force detector 130 from a target force Ft, and thereby obtains the difference $\Delta F$. The target force Ft is a target value of force control set by the operation indication generation unit 290 according to the control program 224. In the present embodiment, the target force Ft includes forces in six-axis directions (Fxt, Fyt, Fzt, Txt, Tyt, Tzt) and the measuring force Fm also includes forces in six-axis directions (Fxm, Fym, Fzm, Txm, Tym, Tzm). The subtractor 251 calculates difference $\Delta F$ of these six-axis directions, respectively. Accordingly, the difference $\Delta F$ of the force includes differences in six-axis directions ($\Delta Fx$, $\Delta Fy$, $\Delta Fz$, $\Delta Tx$, $\Delta Ty$, $\Delta Tz$). However, as the axis direction to be subjected to the force control, one or more axis direction can be selected, and it is possible to execute the force control only on the selected axis direction.

The integrator 252 includes six integrators which execute integral operation on each of the differences in six-axis directions ($\Delta Fx$, $\Delta Fy$, $\Delta Fz$, $\Delta Tx$, $\Delta Ty$, $\Delta Tz$). The presence or absence of the application of the six integrators 252 can be set independently for six-axis directions depending on whether or not the controller adjustment unit 280 enables the individual integrators 252. The integral gain KIj (j is 1 to 6) of the six integrators 252 can also be set each independently by the controller adjustment unit 280.

Setting the integral gain KIj of an integrator 252 to zero is equivalent to disabling the integrator 252. Whether or not to apply each integrator 252 in the six-axis directions and the integral gains KIj thereof are set by the control program 224 created by the robot control program creation unit 240, respectively.

The adder 253 adds the force difference $\Delta F$ and the output of the integrator 252. The output of the adder 253 is input into the force controller 254. The force controller 254 calculates the force derived correction amount $\Delta S$, for example, by executing the force controller 254 on a motion equation of the impedance control using the difference $\Delta F$ between the target force Ft and the measuring force Fm. The force derived correction amount $\Delta S$ means the magnitude of the position S to which the TCP is required to be moved to eliminate the difference $\Delta F(t)$ between the target force Ft and the measuring force Fm in a case where the TCP receives mechanical impedance. Here, the "position S" means the position in six-axis directions. The impedance control can be executed according to the following Equation (1a) or (1b).

$$M\Delta\ddot{S}+D\Delta\dot{S}(t)+k\Delta S(t)=\Delta F(t) \quad (1a)$$

$$M\Delta\ddot{S}+D\Delta\dot{S}(t)+k\Delta S(t)=\Delta F(t)+\int K_{ij}\Delta F(t)dt \quad (1b)$$

The left side of Equations (1a) and (1b) is formed of a first term obtained by multiplying a second-order differential value of the position S of the TCP by a virtual inertia parameter M, a second term obtained by multiplying a differential value of the position S of the TCP by a virtual viscosity parameter D, and a third term obtained by multiplying the position S of the TCP by a virtual elastic parameter K. These parameters M, D, and K are values set by the controller adjustment unit 280 according to the control program 224. Each of the parameters M, D, and K may be set to a different value for each direction or may be set to a common value regardless of the direction. The first term on the right side of Equations (1a) and (1b) is formed of the force deviation $\Delta F(t)$ obtained by subtracting the measuring force Fm from the target force Ft. The second term of Equation (1b) corresponds to the integral operation by the integrator 252.

The indication combiner 255 obtains a target position (St+$\Delta S$) of the position control by adding the force derived correction amount $\Delta S$ output from the force controller 254 and a position target value St given from the operation indication generation unit 290. The position target value St is a target value of the position control set by the operation indication generation unit 290 according to the control program 224. The position target value St includes components (Xt, Yt, Zt, Rxt, Ryt, Rzt) in the six-axis directions.

The position controller 256 executes the position control depending on the target position (St+$\Delta S$) given from the indication combiner 255 and a measurement position Sm given from a position sensor 160 of the robot 100. The measurement position Sm includes components (Xm, Ym, Zm, Rxm, Rym, Rzm) in the six-axis directions. The measurement position Sm may be indirectly determined based on a signal from the position sensor 160. The position controller 256 executes, for example, PD control. An output Dc of the position controller 256 is applied to an actuator of the robot 100 as an operation amount.

The robot control device 200 is configured to be able to set whether or not to apply the integrator 252 to the difference $\Delta F$ between the target force Ft and a measuring force Ft and set the adjustment of the integral gain KIj in the integrator 252 for a specific control direction among a plurality of axial directions. Accordingly, it is possible to apply the integrator 252 only for the specific control direction.

For the control direction to which the integrator 252 is applied, it is preferable to automatically adjust the gain of the force controller 254 so as to reduce the overshoot of the measuring force. Specifically, for example, it is possible to reduce the overshoot by increasing the virtual viscosity parameter D. In this way, it is possible to prevent the overshoot of the measuring force from being excessively increased by the application of the integrator 252.

Figure 5:
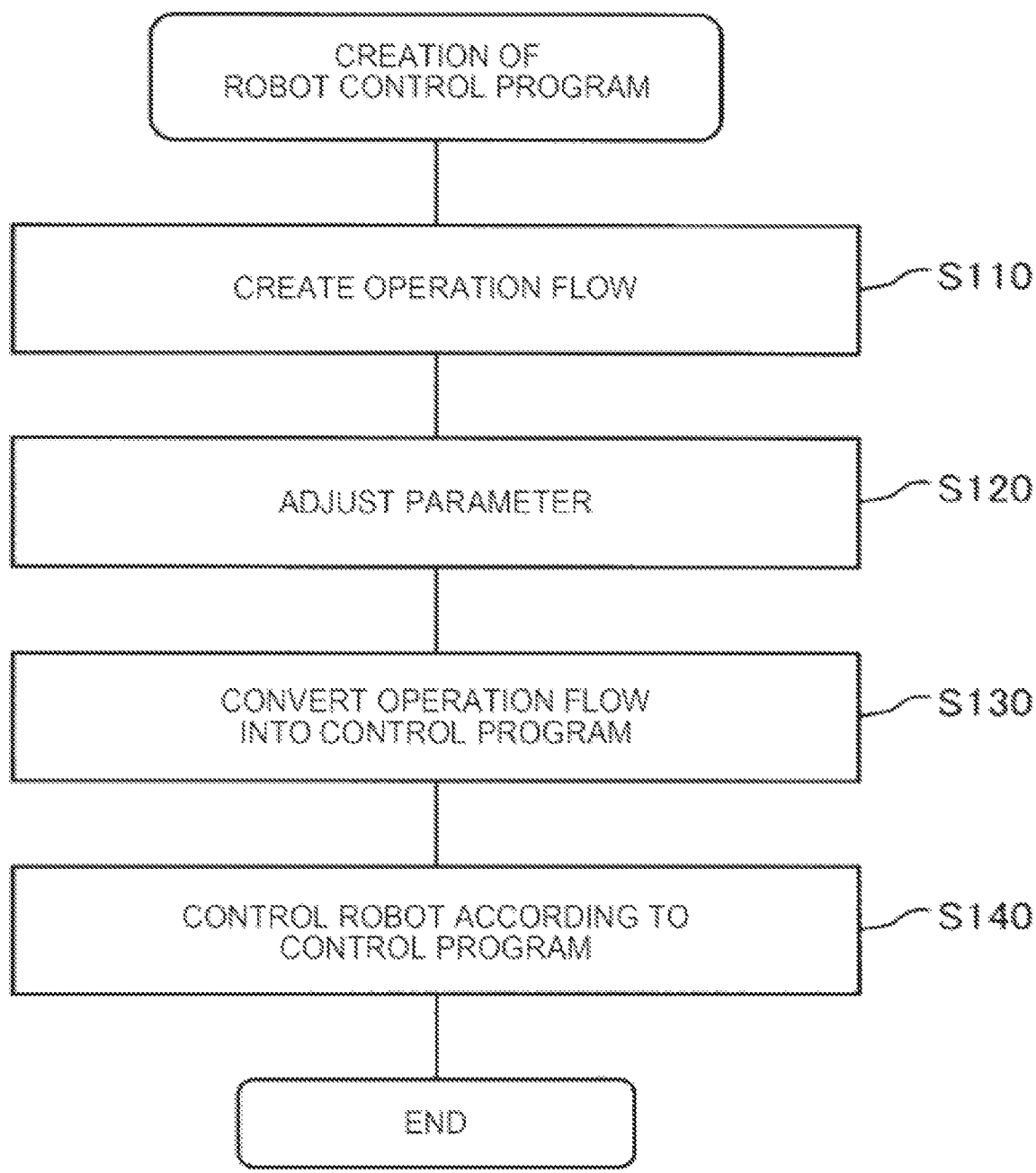
FIG. 5 is a flowchart of a procedure for creating a robot control program.

FIG. 5 is a flowchart showing a procedure for creating a robot control program, and FIGS. 6A to 6D are explanatory diagrams of the procedure. The process in FIG. 5 starts when the teacher operates an application program for executing the robot control program creation unit 240.

Figure 6A:
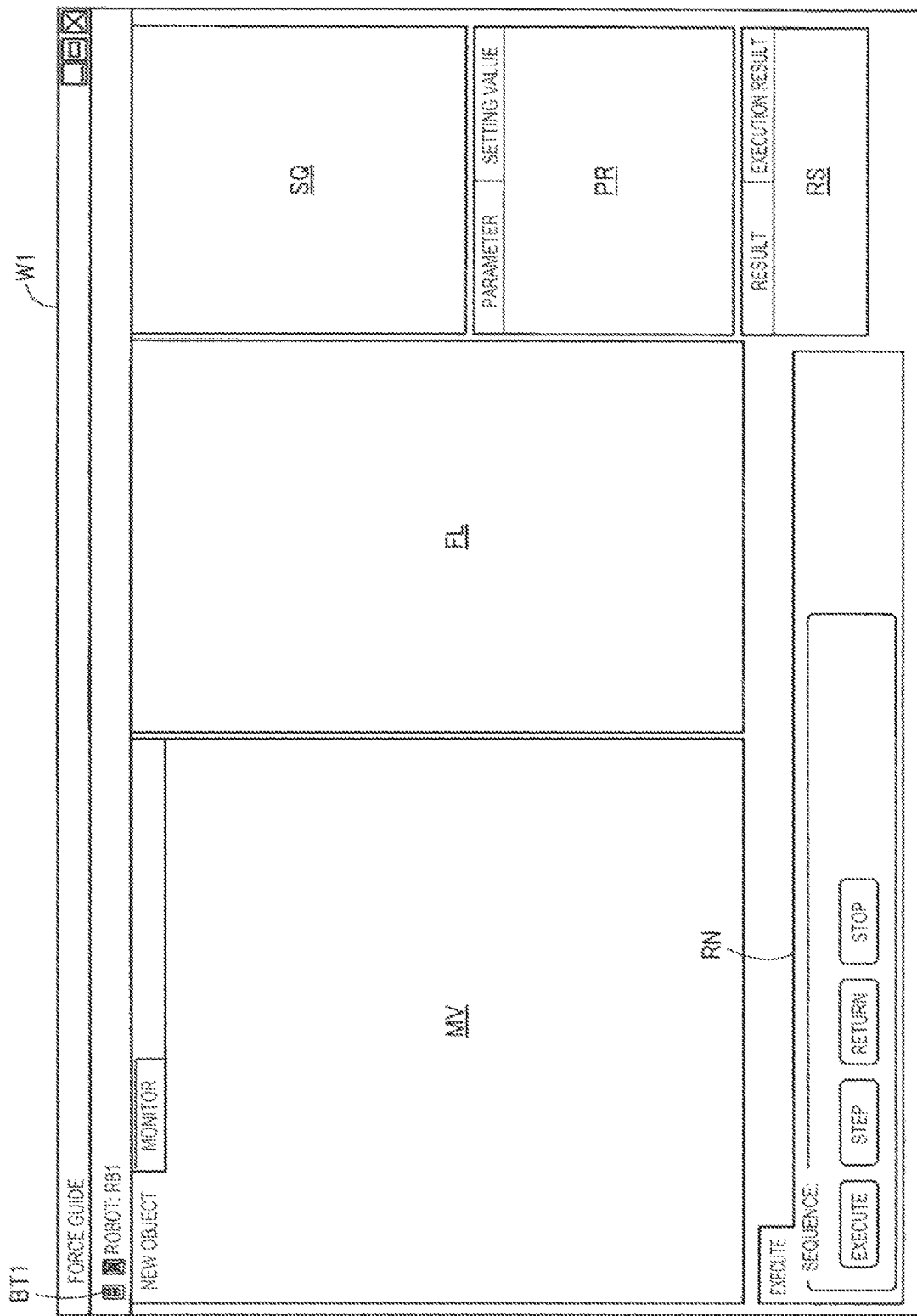
FIG. 6A is an explanatory diagram showing a procedure for creating a control program of work using a force detector.

FIG. 6A shows an example of a window W1 displayed on the display device 260 by the display control unit 242 when the robot control program creation unit 240 is operated. The window W1 corresponds to an input screen for creating an operation flow of work including one or more operations. The window W1 includes the following areas.

(1) Main view area MV is an area for displaying options of operation objects and conditional branch objects to be described later, execution results of a control program, and the like.

(2) Operation flow creation area FL is an area for displaying the operation flows in which a plurality of objects are graphically placed in an editable manner. The work represented by the operation flow is also called "sequence".

(3) Sequence display area SQ is an area for displaying a tree structure of the sequence.

(4) Parameter setting area PR is an area for setting work parameters related to the entire work or operation parameters related to individual operations.

(5) Result area RS is an area for displaying execution results of the control program.

(6) Execution indication area RN is an area for indicating execution of the control program.

In the example in FIG. 6A, a plurality of areas in the window W1 may or may not be divided into different frames. A button BT1 for indicating the start of the procedure for creating the control program of the work is provided on the upper left of the window W1. When the teacher presses the button BT1, an input screen for starting step S110 in FIG. 5 is displayed on the display device 260 by the display control unit 242.

Figure 6B:
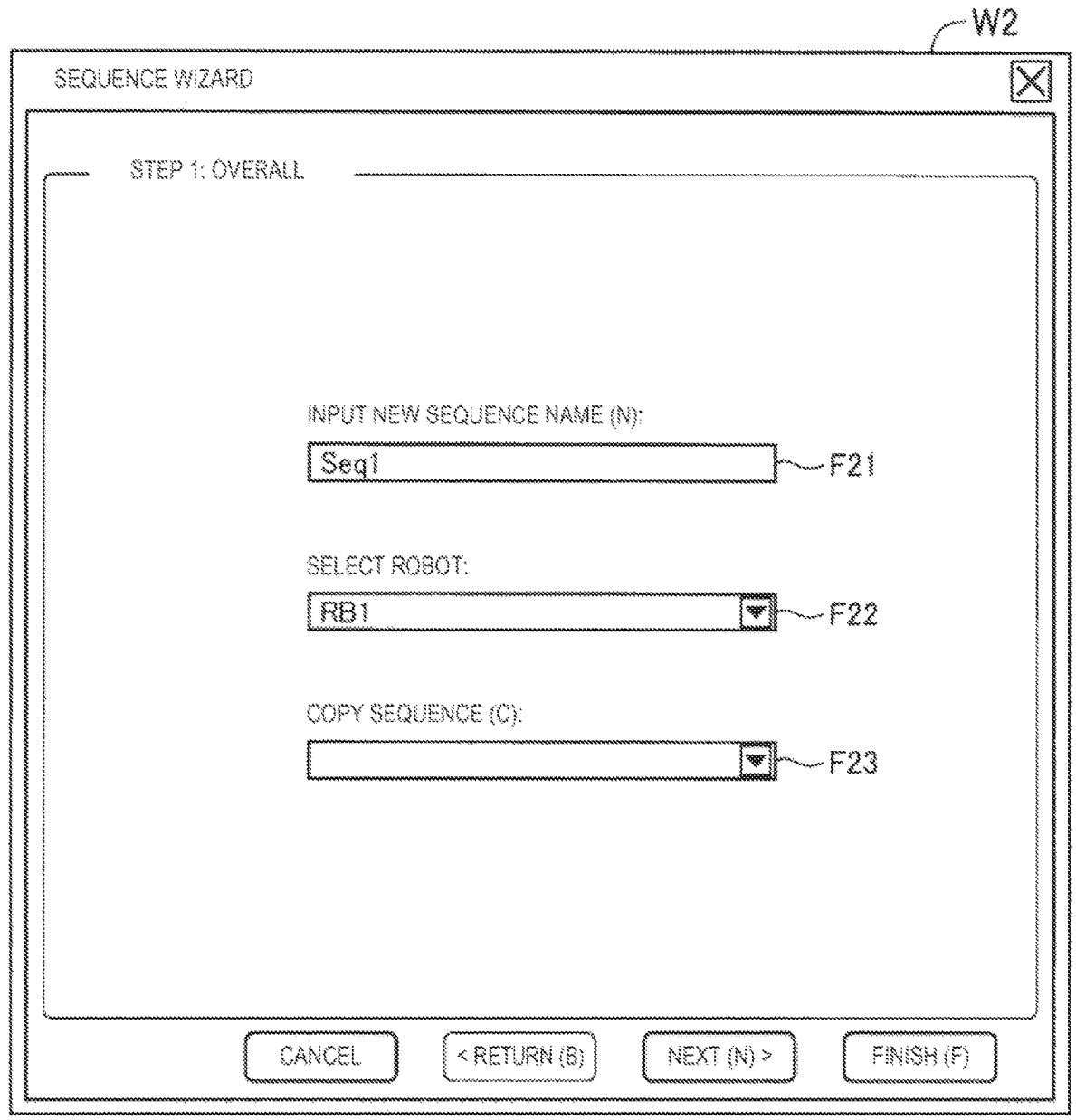
FIG. 6B is an explanatory diagram showing a procedure for creating a control program of work using a force detector.

FIG. 6B shows an example of a window W2 as an input screen for starting step S110. The window W2 includes the following areas.

(1) Sequence name setting area F21 is an area for setting a name for a new sequence. In the example in FIG. 6B, "Seq1" is input as the sequence name.

(2) Robot selection area F22 is an area for selecting a type of a robot to be used from a plurality of options. In the example of FIG. 6B, an "RB1" type robot is selected.

(3) Sequence copy indication area F23 is an area for designating copying of an already created sequence. In this area, for example, sequence names of a plurality of sequences registered in the memory 220 in advance are displayed as a pull down menu. In the case where the sequence copy is used, the settings described in FIG. 6C become unnecessary, and the procedure proceeds to the screen of FIG. 6D described later.

Figure 6C:
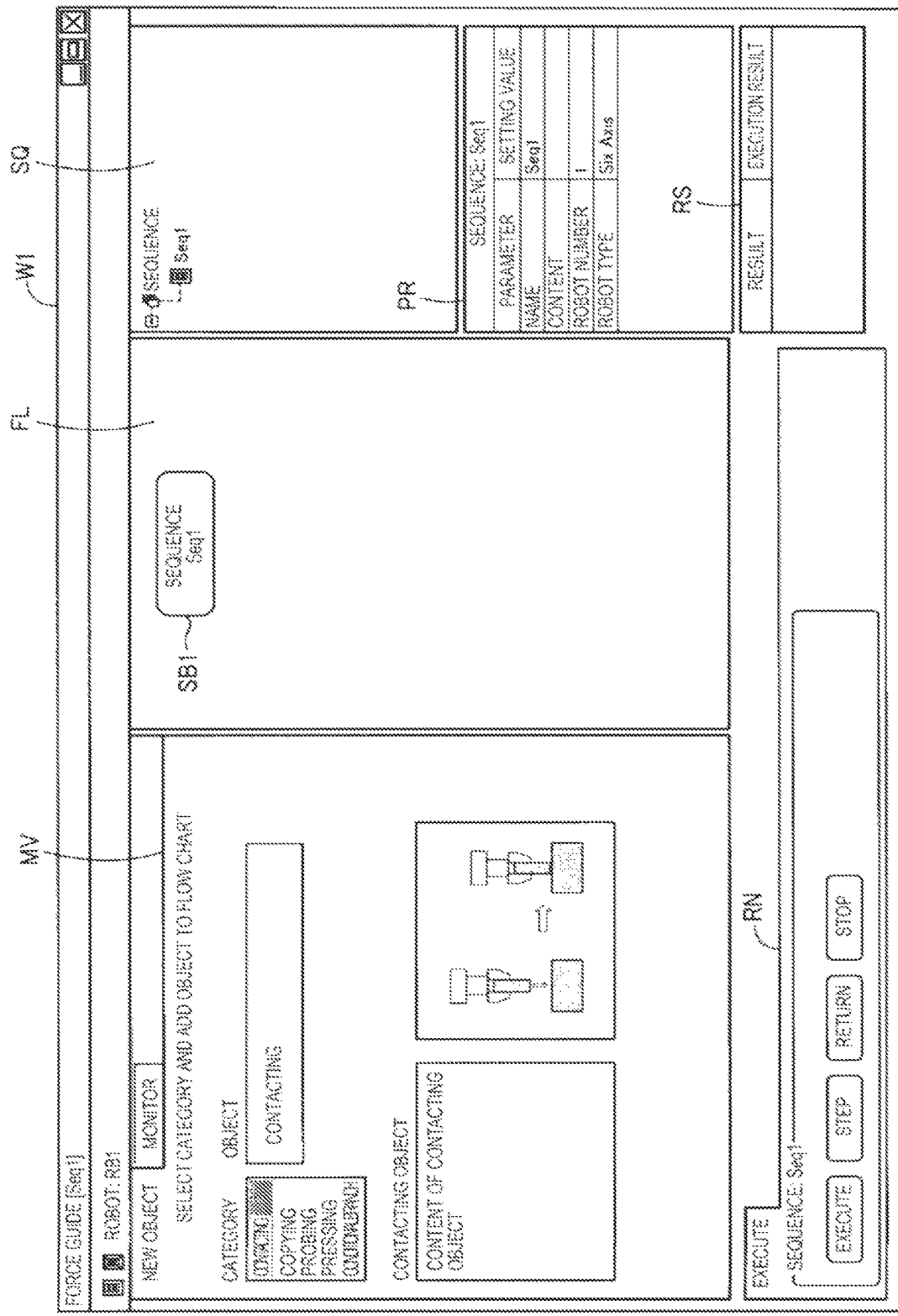
FIG. 6C is an explanatory diagram showing a procedure for creating a control program of work using a force detector.

In the present embodiment, the procedure proceeds to the screen in FIG. 6C without using the sequence copy. That is, in FIG. 6B, when the teacher presses the "next" button without inputting a field F23, the display content of the display device 260 is changed to the window W1 shown in FIG. 6C.

FIG. 6C shows a state in which the creation of the operation flow is started in the window W1 shown in FIG. 6A. The following contents are displayed in each area of the window W1.

(1) Main view area MV: a plurality of categories indicating the operations constituting the operation flow and the categories of the conditional branch, name, and icon of the object belonging to each of the categories, the description of the contents of the object, and an image showing the outline of the object are displayed. The object displayed on the main view area MV can be arbitrarily added to the operation flow in the operation flow creation area FL by a work such as drag and drop.

Figure 6D:
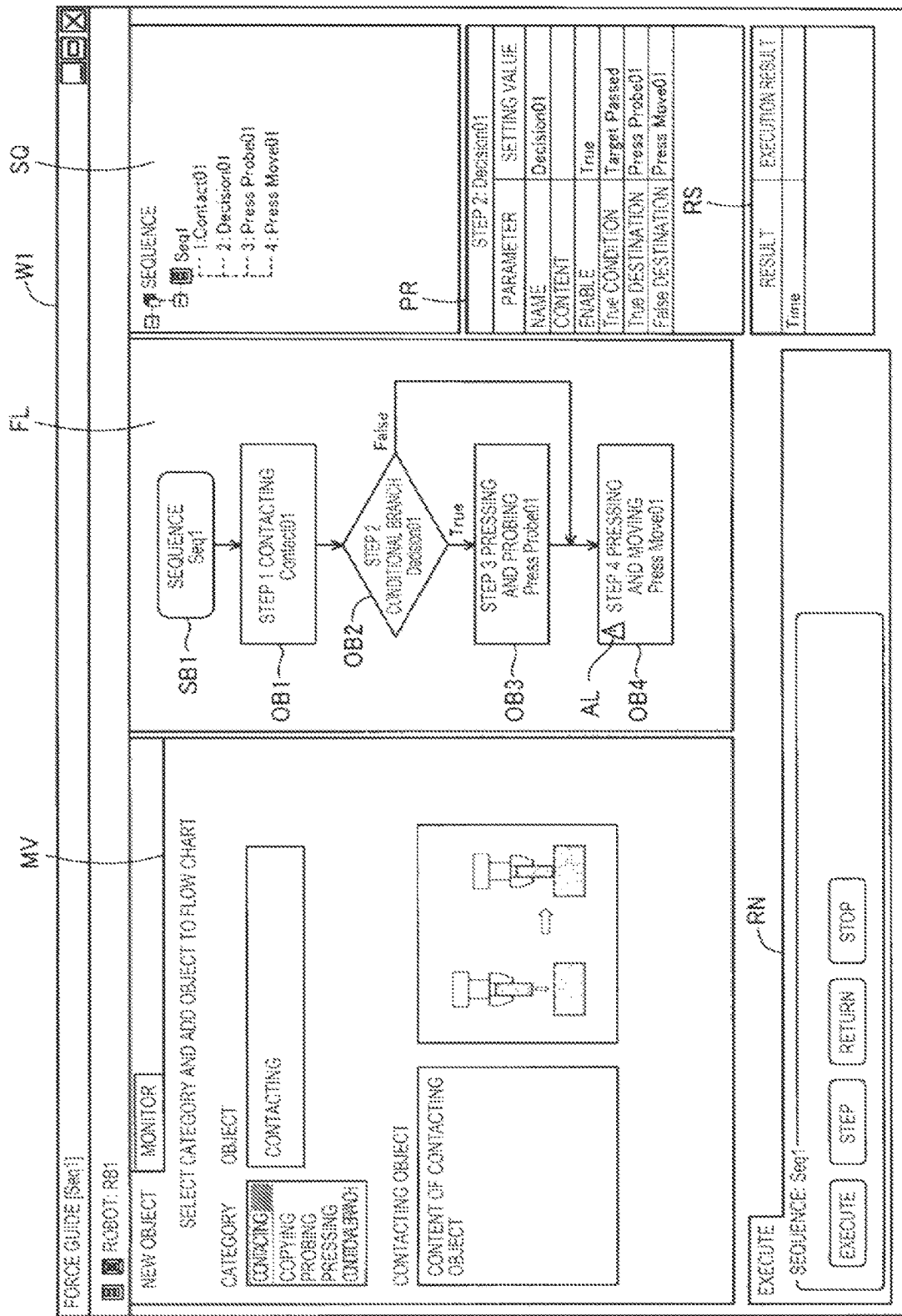
FIG. 6D is an explanatory diagram showing a procedure for creating a control program of work using a force detector.

(2) Operation Flow Creation Area FL: the operation flow in which one or more objects are graphically placed is displayed in an editable manner. As shown in FIG. 6D, at the start of the creation of the operation flow, only a sequence block SB1 indicating a sequence label is placed in the operation flow creation area FL.

(3) Sequence Display Area SQ: the tree structure of the sequence displayed in the operation flow creation area FL is displayed.

(4) Parameter Setting Area PR: when one of the blocks placed in the operation flow creation area FL is selected, the parameters corresponding to the selected block are displayed.

FIG. 6D shows a state in which the teacher created an operation flow in the operation flow creation area FL of the window W1. In this example, blocks of a contacting object OB1, a conditional branch object OB2, a pressing and probing object OB3, and a pressing and moving object OB4 are placed in this order below the sequence block SB1. In the block of each object, the name and icon of the object are displayed. Among the four objects OB1 to OB4, the three objects OB1, OB3, and OB4 are operation objects except for the conditional branch object OB2. The categories of the operation and the operation objects will be described later. In the operation flow, any object displayed in the main view area MV can be arbitrarily added, and any object in the operation flow can be deleted.

In FIG. 6D, when one of the blocks SB1 and OB1 to OB4 placed in the operation flow creation area FL is selected, the parameters corresponding to the selected block are displayed in the parameter setting area PR. For example, when the sequence block SB1 is selected, the work parameters related to the entire sequence are displayed. When one of the blocks OB1 to OB4 of the object is selected, the parameters related to the objects are displayed. In the example of FIG. 6D, the parameters related to the conditional branch block OB2 are displayed. These parameters are changed as necessary.

FIG. 7 shows an example of operation objects which can be used in constituting an operation flow, and FIGS. 8A to 8D show outlines of operations of some operation objects. A plurality of operation objects can be categorized into the following four categories. All of these operations involve force control.

Category 1: Contacting

Contacting is an operation of moving in a designated direction and stopping when receiving reaction force.

Figure 8A:
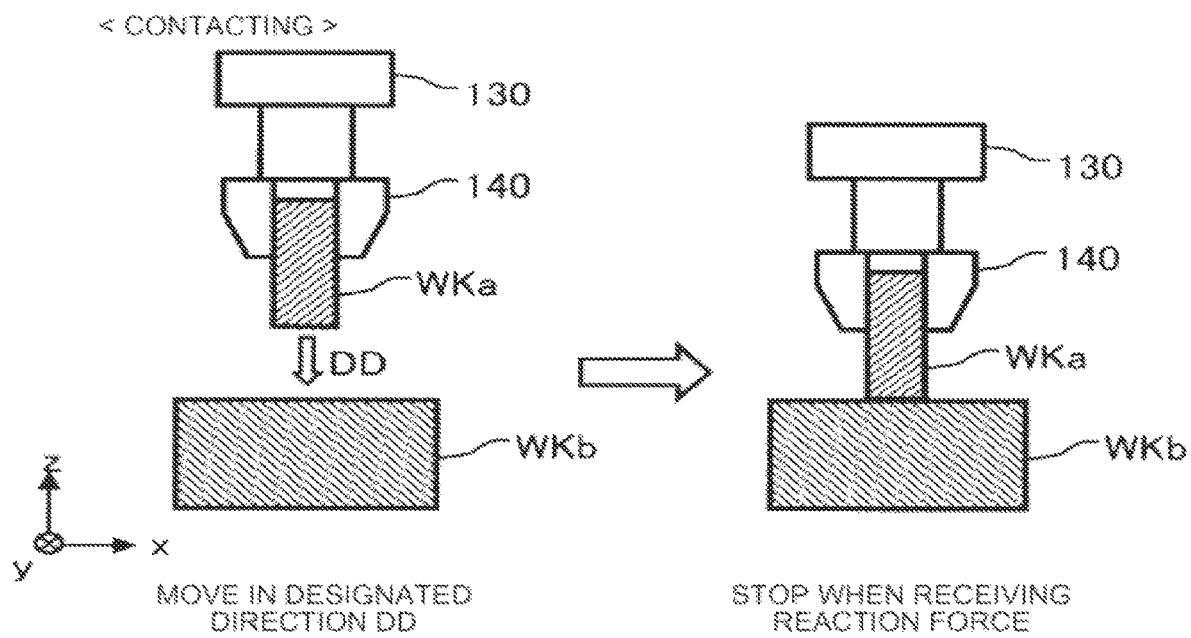
FIG. 8A is an explanatory diagram showing a schematic operation of a contacting object.

The category of the contacting operation includes a contacting object. As shown in FIG. 8A, in the contacting object, a workpiece WKa held by the end effector 140 is moved in a designated direction DD and the end effector 140 is stopped when the reaction force is measured by the force detector 130. The workpieces WKa and WKb shown in FIG. 8A have no relation to the workpieces WK1 and WK2 shown in FIG. 1, and virtual workpieces for describing an outline of an operation. This point also applied to FIG. 8B to FIG. 8D described later.

Category 2: Copying

Copying is an operation of maintaining the state in which the force of a designated axis becomes zero.

The category of the copying operation includes the following three types of operation objects.

(a) Relaxed object is a copying operation so that the force of the designated axis becomes zero.

Figure 8B:
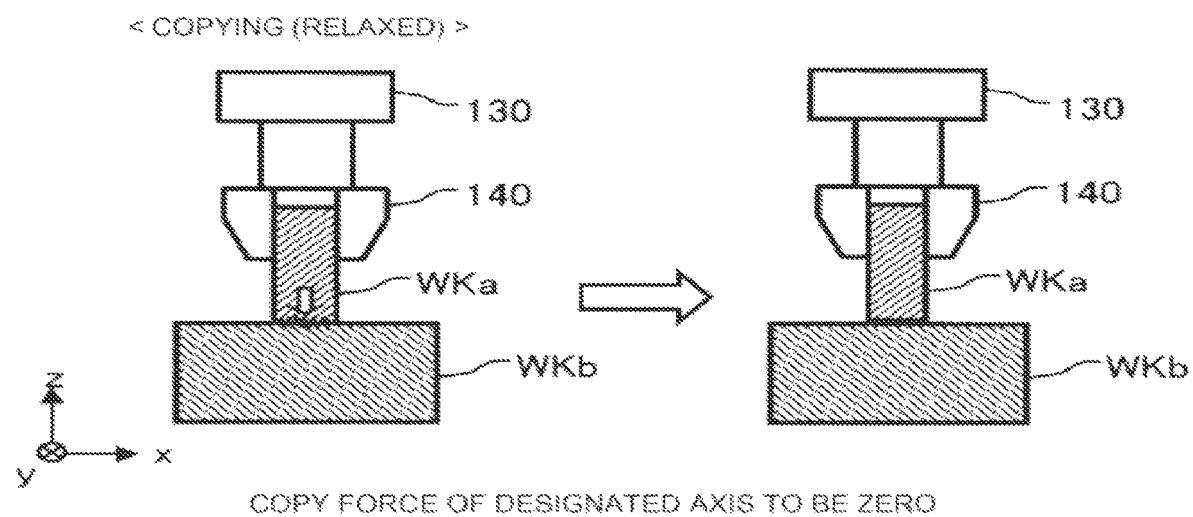
FIG. 8B is an explanatory diagram showing a schematic operation of a relaxed object.

As shown in FIG. 8B, in the relaxed object, the copying operation is executed so that the force of the designated axis becomes zero. In the example of FIG. 8B, the force in the z axis direction measured by the force detector 130 becomes zero by returning the end effector 140 in the −z axis direction when the force between the workpieces WKa and WKb in the z axis direction is not zero.

(b) Copying and moving object is an operation of moving along a designated trajectory while copying so as to set the force of the designated axis to zero.

(c) Surface matching object is an operation of copying and pressing at an angle in the designated direction to match the surface to surface.

Category 3: Probing

Probing is an operation of probing a position where the force of the designated direction becomes zero.

The category of the probing operation includes the following two types of operation objects.

(a) Pressing and probing object is an operation of finding a hole by pressing and probing along the designated trajectory.

Figure 8C:
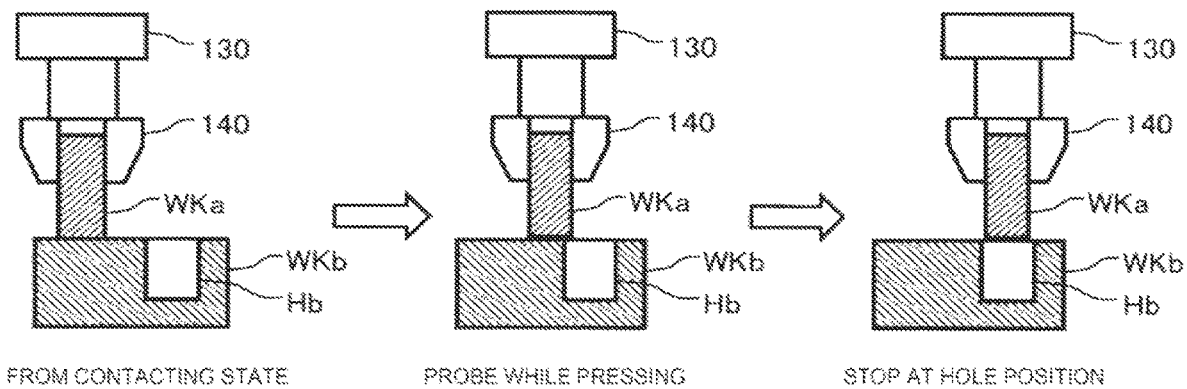
FIG. 8C is an explanatory diagram showing a schematic operation of a pressing and probing object.

As shown in FIG. 8C, in the pressing and probing object, a position where the force in the designated direction becomes zero is probed while the workpiece WKa held by the end effector 140 is pressed in the designated direction and the end effector is stopped at a position of a hole Hb. As a probing trajectory, one trajectory can be selected from a plurality of candidates such as a linear trajectory and a spiral trajectory.

(b) Contacting and probing object is an operation of finding a hole by repeating the contacting operation.

Category 4: Pressing

Pressing is an operation of pressing with designated force in the designated direction.

The category of the pressing operation includes the following two types of operation objects.

(a) Pressing (simple pressing) object is an operation of pressing with designated force in the designated direction. In this operation, "copying" operation can be executed with respect to other designated axes.

(b) Pressing and moving object is an operation of moving while pressing with designated force in the designated direction. In this operation, "copying" operation can be executed with respect to other designated axes.

Figure 8D:
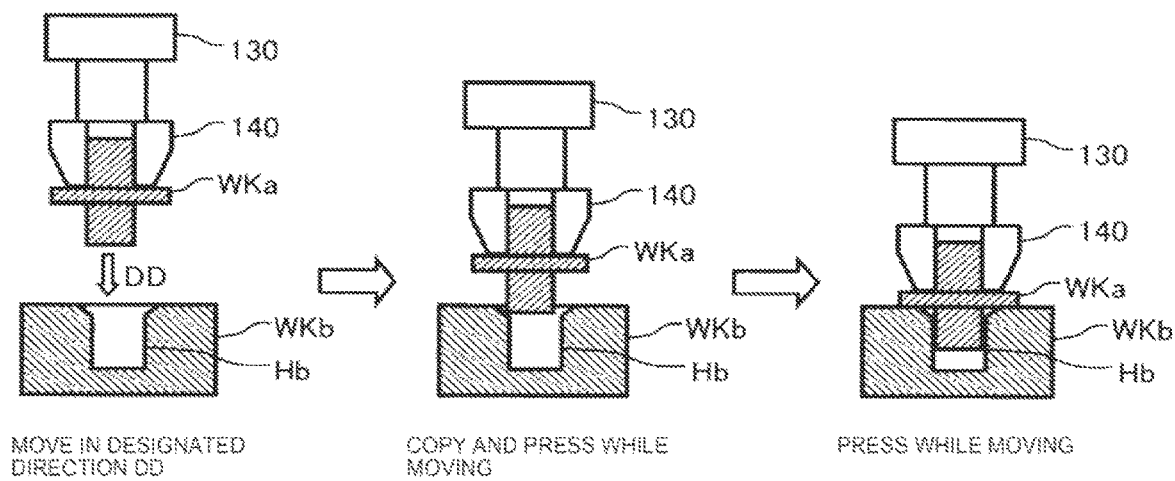
FIG. 8D is an explanatory diagram showing a schematic operation of a pressing and moving object.

As shown in FIG. 8D, in the pressing and moving object, the end effector 140 is moved in the designated direction DD and pressed with designated force, and then, is moved in a direction different from the designated direction while maintaining (that is copying) the pressing with designated force. In the example of FIG. 8D, an operation of inserting the workpiece WKa held by the end effector 140 into the hole Hb of a workpiece WKb is executed by the pressing and moving.

As parameters of four objects OB1 to OB4 shown in FIG. 6D, for example, the following parameters can be set. In particular, with respect to the operation objects OB1, OB3, and OB4, a parameter defining end condition of an operation and a parameter defining a success determination condition of an operation can be set.

Parameters of Contacting Object OB1

(1) Example of Operation Parameters Defining Operation

Contacting direction: −Z direction (contacting direction is automatically set from the fitting directions set as the work parameter)

Estimated contacting distance: 10 mm

Operation speed: 5 mm/s

Force control gain at contacting: 1.0

(2) Example of End Condition

Threshold value of force: 5 N (operation stops when the force exceeds 5 N)

(3) Example of Success Determination Condition

Success determination condition: time-out time=3 seconds (In the case where the end condition is satisfied until the time-out time, it is determined that the operation is successful, and in the case where the end condition is not satisfied, it is determined that the operation is failed)

Operation on failure: continue the sequence (Designate how to proceed when the operation is failed. It is possible to designate the continuance of the sequence or the end of the sequence)

Parameters of Conditional Branch Object OB2

(1) Example of Determination Condition of Conditional Branch

Determination target object: Contact01 (Conditional branch is executed according to the result of the determination target object)

Conditions under which determination of the conditional branch is true: successful operation (it is possible to designate either case where the operation of the determination target object is successful or the determination target object is failed)

(2) Example of Destination of Conditional Branch

Destination when the determination is true: PressProbe01 (any position in the operation flow can be designated)

Destination when the determination is false: PressMove01 (any position in the operation flow can be designated)

Parameters of Pressing and Probing Object OB3

(1) Example of Operation Parameters Defining Operation

Route: spiral (Spiral or straight line can be designated as a probing route)

Route shape:
Diameter of spiral: 5 mm
Pitch of spiral: 1 mm

Operation speed: 5 mm/s

Pressing direction: −Z direction (pressing direction is automatically set from the fitting direction set as the work parameter)

Pressing force: 3 N

Force control gain during pressing: 2.0

(2) Example of End Condition

Make AND conditions of the following conditions C1 and C2:

Condition C1: threshold value of force (below the threshold value of force)

Condition C2: threshold value of position movement amount (moved to the range exceeding the threshold value from the object start position)

(3) Example of Success Determination Condition

Success determination condition: in the case where the end condition is satisfied by the end of the route, it is determined that the operation is successful, and in the case where the end condition is not satisfied, it is determined that the operation is failed.

Operation on failure: end the sequence

Parameters of Pressing and Moving Object OB4

(1) Example of operation parameters defining operation

Route: straight line

Moving direction: −Z direction (moving direction is automatically set from the fitting direction set as the work parameter)

Moving distance: 30 mm

Moving speed: 10 mm/s

Force control in Fx, Fy, Fz direction: copying

Force control in Fz direction: 3 N pressing

Force control in Tx, Ty direction: copying

Force control in Tz direction: OFF

Force control gain: the gain of Fx is 1, the gain of Fy is 1, the gain of Fz is 2, the gain of Tx is 300, and the gain of Ty is 300

(2) Example of End Condition

Make AND conditions of the following conditions C1 and C2:

Condition C1: force acceptable value (the range of the force in the pressing direction is within the range of target force±acceptable value)

Condition C2: threshold value of position movement amount (moved to the range exceeding the threshold value from the object start position)

(3) Example of Success Determination Condition

Success determination condition: in the case where the end condition is satisfied by the end of the route, it is determined that the operation is successful, and in the case where the end condition is not satisfied, it is determined that the operation is failed.

Operation on failure: end the sequence

As can be understood from these examples, in the present embodiment, since it is possible to display the parameter setting area PR in which the parameters defining the operation, the parameters defining the end condition of the operation, and the parameters defining the success determination condition of the operation can be set, it is possible to easily create a control program including end of operation and success/failure determination. It may be a mode in which it is not possible to set one or both of the parameters defining the end condition of the operation, the parameters defining the success determination condition of the operation.

In the example of FIG. 6D, an alarm mark AL is displayed with respect to the fourth operation object OB4. The alarm mark AL is a mark displayed when an unacceptable parameter value is included in the parameters set in the parameter setting area PR with respect to the operation object OB4. Items and values of the defective parameters may be displayed when the mouse pointer is moved over the alarm mark AL. In a case where the teacher sees the alarm mark AL, since the teacher knows that there is a deficiency in the parameter of the operation object OB4, the deficiency in the parameter can be corrected.

When the operation flow of the work is created as shown in FIG. 6D, it is possible to cause the robot 100 to execute the operation according to the operation flow. For example, when the teacher presses the "execute" button" in the execution instruction area RN of FIG. 6D, the conversion unit 244 (FIG. 3) converts the operation flow into the control program 224, and the control execution unit 250 causes the robot 100 to execute the work by executing the control program 224. This corresponds to a trial of the control program 224. The display control unit 242 can issue an execution instruction to operate the robot 100 by executing the created control program 224.

Figure 9:
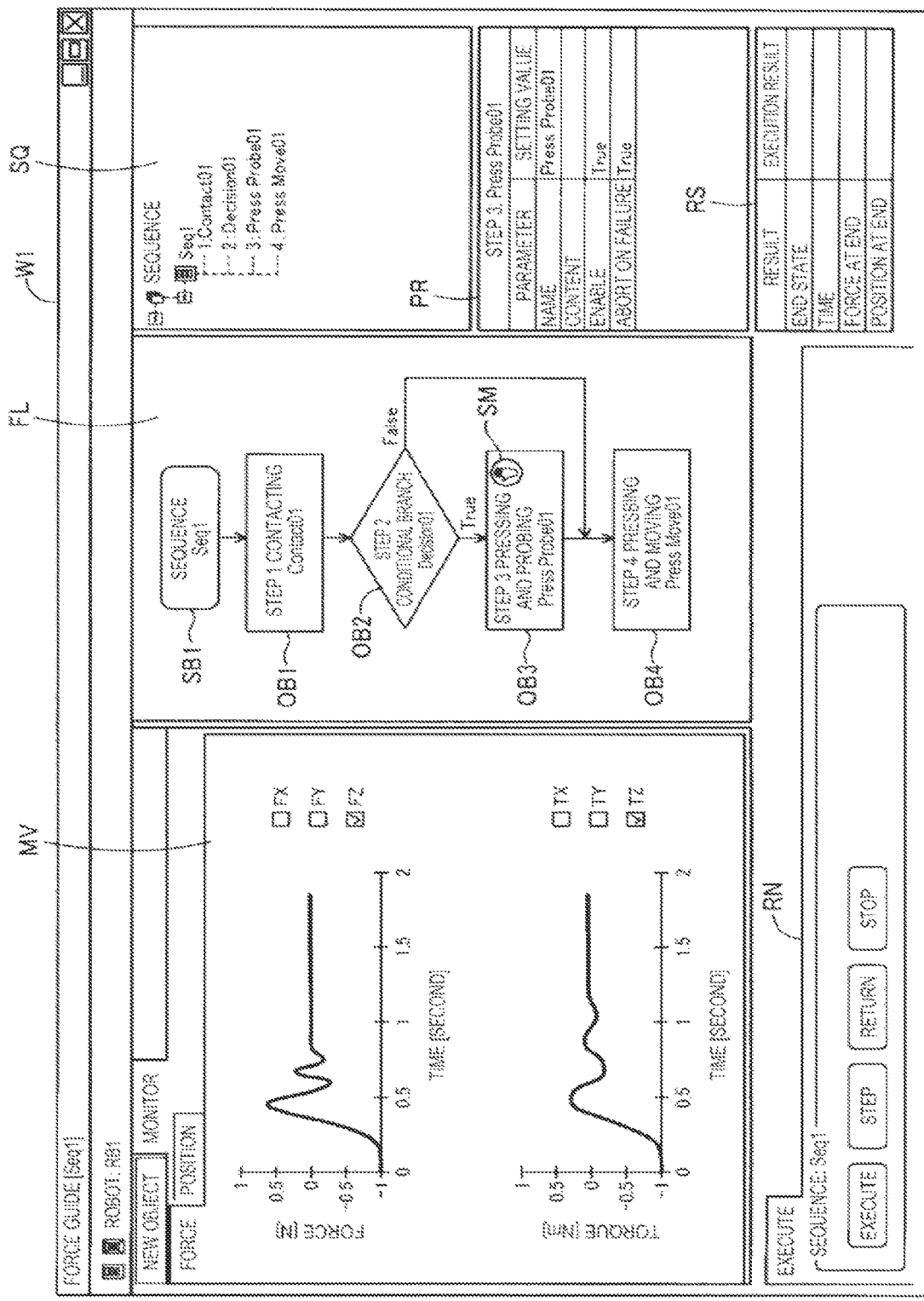
FIG. 9 is an explanatory diagram showing an example of a screen showing a result of work executed according to an operation flow.

FIG. 9 is an explanatory diagram showing an example of a screen showing a result of work executed according to an operation flow. In this example, an execution stop mark SM is set in the third operation object OB3 in the operation flow creation area FL. The execution stop mark SM means temporal stopping the execution in the operation object OB3. The execution stop mark SM can be set, for example, using the context menu of each operation object. The context menu is a menu displayed by right-clicking the mouse.

In the main view area MV, the temporal change of a force Fz in the Z axis direction and the torque Tz around the Z axis are displayed among the plurality of force measured by the force detector 130 at the time of executing the operation flow. In the main view area MV, it is possible to select and display any one or more temporal change of force of the plurality of forced measured by the force detector 130. It is also possible to display the temporal change of the measured position of the TCP and the temporal change of the difference between the target position and the measured position of the TCP on the main view area MV. The period of displaying the result in the main view area MV can be an operation period of any one of the operation objects in the operation flow, or can be the entire period from the start to stop of the execution. For example, when any operation object is selected in the operation flow creation area FL, the execution result of the operation period of the operation object is displayed. When the sequence block SB1 is selected, the result of the entire period from the start to stop of the execution is displayed. The information of some execution results of the control program 224 is also displayed in the result area RS. For example, for any operation object, it is possible to display the end state of the operation (success or failure), time required for the operation, force at the end of the operation, the position at the end of the operation, and the like in the result area RS.

Figure 10:
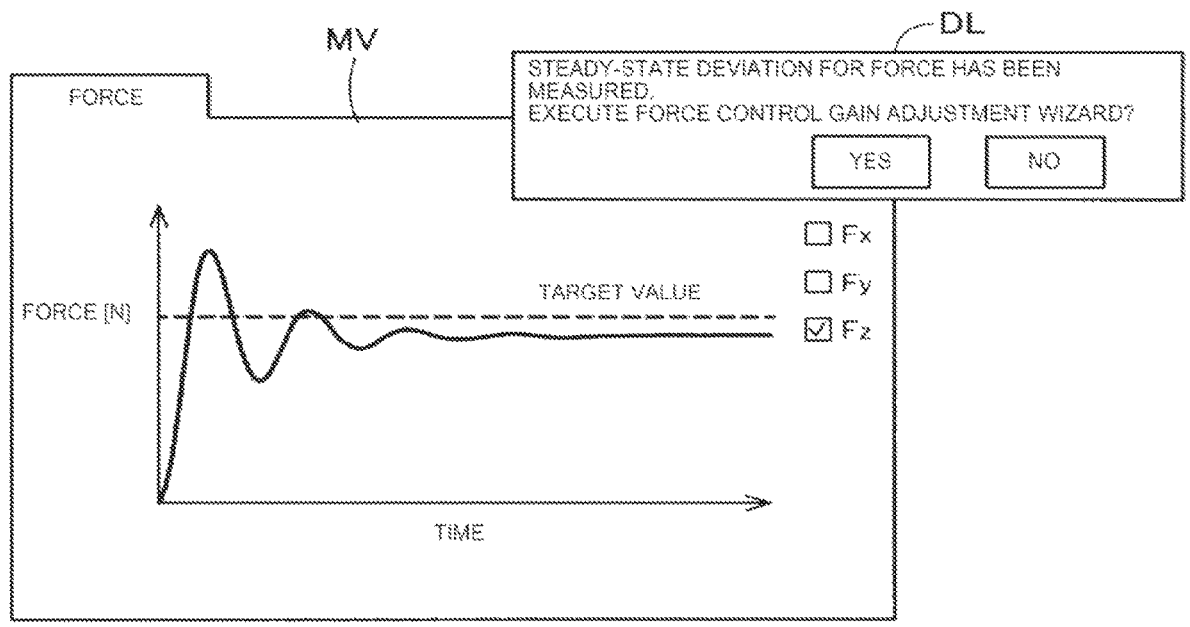
FIG. 10 is an explanatory diagram showing an example of a screen for setting whether or not to apply an integrator.

FIG. 10 is an explanatory diagram showing an example of a screen for setting whether or not to apply the integrator 252 depending on the execution result of the control program 224. Here, a portion of the main view area MV of the window W1 in FIG. 9 and a dialogue box DL urging the start of the setting of the integrator are illustrated, and the other portions of the window W1 are omitted from the drawing. Similar to FIG. 9, the measurement result of the force Fz is displayed in the main view area MV. In this example, it is assumed that the target force of the force Fz and the acceptable value of the steady-state deviation are set in advance as operation parameters. The acceptable value determined by the robot system may be used instead of the acceptable value set by the user.

As a method for setting the acceptable value, a method of setting using constants such as 1 Newton may be used or a method of setting the acceptable value using the ratio with respect to the target force such as 10% of the target force may be used. In a case where the steady-state deviation between the measuring force of the force Fz obtained at the time of executing the control program 224 and the target force is above the acceptable value, the dialogue box DL urging the start of the integrator setting is automatically displayed by the display control unit 242. When the teacher selects "Yes" in the dialogue box DL, the setting of the integrator 252 starts.

Figure 11:
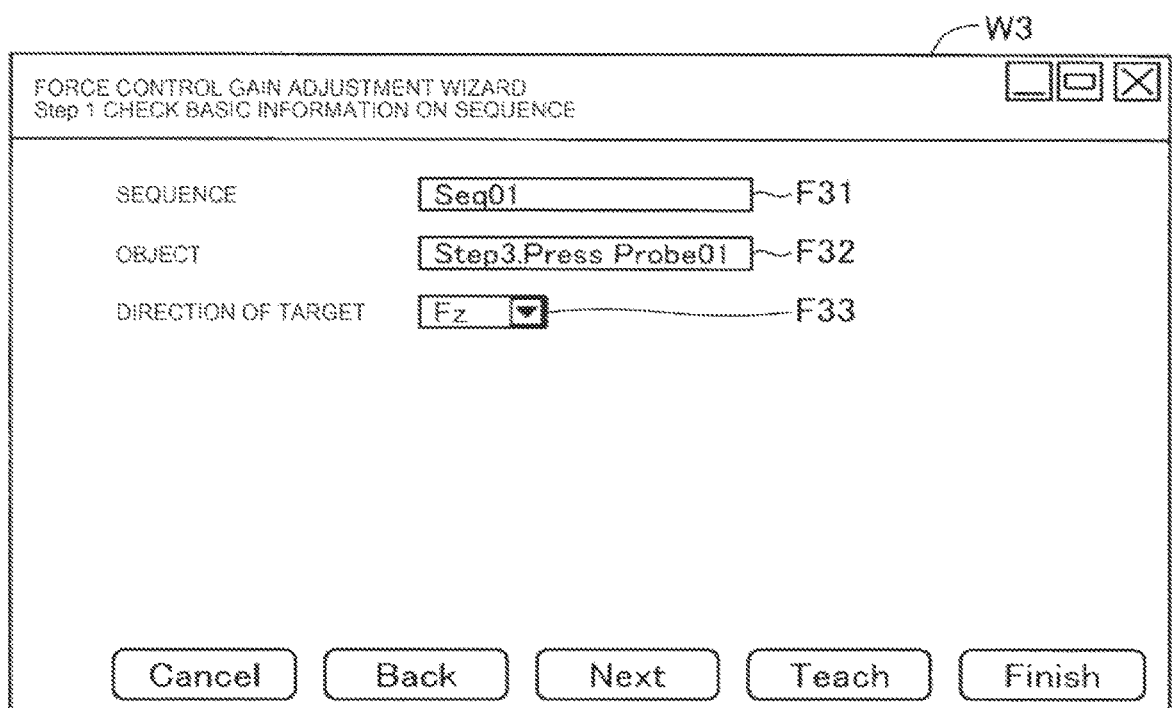
FIG. 11 is an explanatory diagram showing an example of an input screen for starting the setting of the integrator.

FIG. 11 shows an example of a window W3 as an input screen for starting the setting of integrator 252. The window W3 includes the following areas.

(1) Sequence name area F31 is an area for displaying a name of a sequence.

(2) Object selection area F32 is an area for displaying an object name for setting the integrator 252.

(3) Target direction setting area F33 is an area for setting an axial direction of the force for setting the integrator 252. As an axial direction of the force, one axial direction among the plurality of axial directions measurable by the force detector 130 can be set.

The setting values of areas F21 to F23 can be arbitrarily changed by the teacher. When the setting ends, the procedure proceeds to the input screen shown in FIG. 12.

Figure 12:
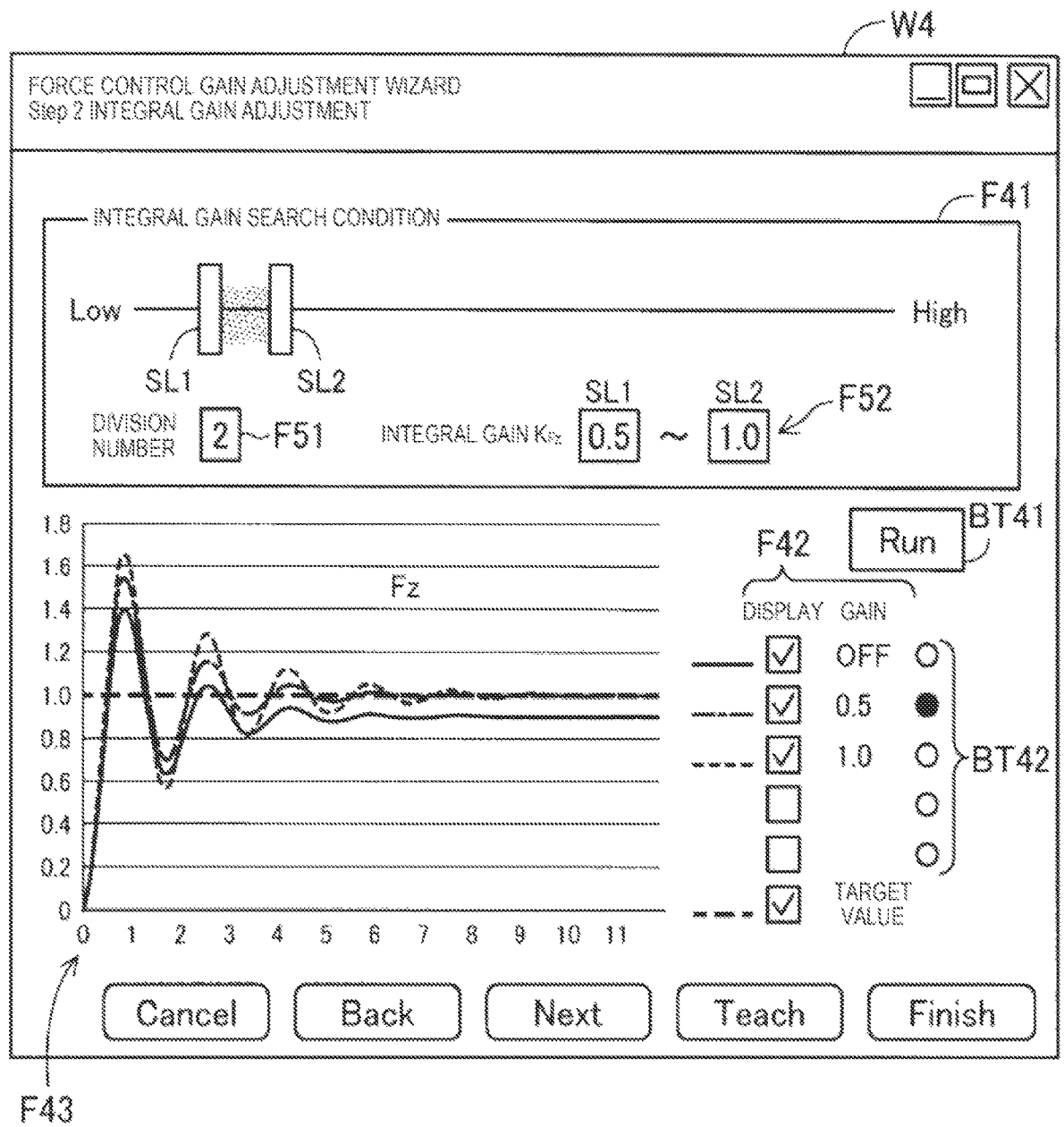
FIG. 12 is an explanatory diagram showing an example of a screen showing adjustment of an integral gain and the adjustment result.

FIG. 12 is an explanatory diagram showing an example of a screen showing the adjustment of the integral gain and the adjustment result. The window W4 at this time includes the following areas.

(1) Integral gain setting area F41 is an area for setting the integral gain. In this example, two slider bars SL1 and SL2, a division number setting area F41, and a gain range setting area F42 are included in the integral gain setting area F41. The slider bars SL1 and SL2 are used for setting the lower limit value and the upper limit value of the integral gain when searching for a preferable value of the integral gain of the integrator 252. Here, the integral gain in the force direction designated in FIG. 11 is set. The numerical value of the integral gain set by the slider bars SL1 and SL2 is displayed in the gain range setting area F42. Instead of using the slider bars SL1 and SL2, the numerical value of the gain range setting area F42 may be directly input. The division number setting area F41 indicates how many of the gain values within the set gain range are to be used as a search target to carry out the trial of the control program 224. For example, in a case where the division number is two, only the two gain values at both ends of the set gain range are used as the integral gains, and the trial of the control program 224 is carried out for the two cases. In a case where the division number is three, the two gain values at both ends of the set gain range and the intermediate value are used as the integral gains, and the trial of the control program 224 is carried out for the three cases. The trial of the control program 224 starts by pushing a button BT41.

(2) Display selection area F42 is an area for selecting which one of the trial results of the control program 224 using the set integral gain is to be displayed in a result display area F43. In this example, it is set to display the three results of the result when the gain is set to OFF (that is, the original result in the case where the integrator 252 is not used), the result when the gain is set to 0.5, and the result when the gain is set to 1.0.

(3) Result display area F43 is an area for displaying the trial result of the control program 224 using the set integral gain.

The teacher can determine which integral gain is a preferable value by looking at the display result of the result display area F43. Once the preferable gain value is determined, the teacher selects one value from a plurality of the integral gain values using a gain selection button B42. In the example of FIG. 12, the gain selection button B42 is a radio button, and the value 0.5 is selected as the preferable integral gain.

The setting of the integrator 252 explained in FIGS. 10 to 12 can be executed for each of any number of axial directions equal to or greater than one. The window W3 shown in FIG. 11 and the window W4 shown in FIG. 12 may be configured as different screen areas included in the same single window. The display control unit 242 may be configured so that these windows W3 and W4 are displayed by another method without going through the dialogue box DL shown in FIG. 10. Specifically, for example, a first screen area for setting whether or not to apply the integrator 252 for the specific control direction and a second screen area on which the integral gain in the integrator 252 can be adjusted may be displayed in the context menu of the operation objects OB1, OB3, and OB4 in the operation flow creation area FL of FIG. 6D.

In the present embodiment, when the robot 100 is operated by executing the control program 224 created in a state where the integrator 252 is not applied, in the case where the steady-state deviation between the measuring force measured by the force detector 130 and the target force is larger than the threshold value set in advance, the dialogue box DL for starting the setting of the application of the integrator 252 is automatically displayed, so that the operator can easily create the control program 224 to which the integrator 252 is applied.

In the display control unit 242, it is preferable to automatically adjust the gain of the force controller 254 (FIG. 4) so as to reduce the overshoot of the measuring force for the control direction to which the integrator 252 is applied. Specifically, for example, it is possible to reduce the overshoot by increasing the virtual viscosity parameter D. In this way, it is possible to prevent the overshoot of the measuring force from being excessively increased by the application of the integrator 252.

The teacher can observe the execution result of the control program 224 as shown in FIG. 9 and adjust the parameters of individual objects as necessary (step S120 of FIG. 5). The adjustment can be executed by changing the parameters of the object displayed in the parameter setting area PR in the state where any one of the objects OB1 to OB4 in the operation flow creation area FL is selected. As a specific example, for example, in a case where the force when contacting in the contacting operation is excessively large, the parameters of the contacting object are adjusted so as to lower the speed in the contacting operation.

When the operation flow is completed as described above, the conversion unit 244 converts the operation flow into the control program 224 according to the indication of the teacher in step S130 in FIG. 5. The indication can be performed, for example, by selecting "create control program" from the context menu of the operation flow creation area FL.

In step S140 of FIG. 5, the robot control device 200 controls the robot and causes the robot to execute the work according to the control program 224 created in step S130. This work can be executed as a checking work for checking the operations of the robot 100 on the production line or an original work for manufacturing a product on the production line.

In the present embodiment, the first screen area (window W3) for setting whether or not to apply the integrator 252 with respect to the difference between the target force and the measuring force of the force detector 130 for the specific control direction and the second screen area (window W4) on which the adjustment of the integral gain in the integrator 252 can be performed can be displayed as an input screen. As a result, it is possible to easily create a control program that applies the integrator 252 only for the specific control direction. The first screen area (window W3) and the second screen area (window W4) may be configured as different screen areas included in the same single screen.

The invention is not limited to the above-described embodiments, examples, and modification examples, and can be realized in various configurations without departing from the gist thereof. For example, the technical features in the embodiments, examples, and modification examples corresponding to the technical features in each mode described in the Summary of the Invention can be replaced or combined as appropriate to solve part or all of the above-mentioned problems, or to achieve some or all of the above-mentioned effects. Also, unless its technical features are described as essential in this specification, it can be deleted as appropriate.

The entire disclosure of Japanese Patent Application No. 2018-026570, filed Feb. 19, 2018, is expressly incorporated by reference herein.

What is claimed is:

1. A robot control device comprising:
an input device through which an instruction is input:
a display having a switchable plurality of screens, the switchable plurality of screens including a first screen and a second screen, the first screen being divided into a first area and a second area, the first area being configured to display a plurality of operation objects corresponding to operations using force control of a robot having a force detector, the second area being configured to display an object operation flow corresponding to a robot operation flow of the robot;
a memory configured to store a program and a time series target force of the force detector corresponding to the robot operation flow of the robot: and a processor configured to execute the program so as to:

cause the first area of the display to display the plurality of operation objects and the conditional operation object;
receive an input as the instruction via the input device; select an object of the plurality of operation objects and the conditional operation object based on the input;
cause the second area of the display to display the selected object as a part of the object operation flow;
repeat the receiving of the input, the selecting of the object, and the causing of the second area to display the selected object a predetermined number of times to complete the object operation flow;
convert the completed object operation flow into a control program, the control program being configured to control the operations of the robot;
execute the control program to control the robot; detect a time series measuring force of the force detector during the execution of the control program;
cause the first area of the display to display the time series measuring force of the force detector and a selection for selecting whether an integrator is applied to a difference between the time series target force and the time series measuring force for a specific control direction among a plurality of control directions, an application of the integrator corresponding to integrating the difference;
receive a selection input as the instruction via the input device with respect to the selection;
cause the display to switch to display the second screen when the selection input corresponding to the application of the integrator; and
receive an adjusting input via the input device for adjusting an integral gain of the integrator when a result of the execution of the control program is in a predetermined condition.

2. The robot control device according to claim 1, wherein the processor is configured to independently select whether or not the integrator is applied to the difference for each of the plurality of control directions.

3. The robot control device according to claim 2, wherein, when the integrator is applied, the processor is configured to obtain the difference by subtracting the time series measuring force from the time series target force,
the processor is configured to input the difference into the integrator,
the processor is configured to add the difference and an output of the integrator to create a force control output, and
the processor is configured to perform the force control with respect to a work based on the force control output by using the force detector.

4. The robot control device according to claim 2, wherein, when the robot is operated by executing the control program created in a state where the integrator is not applied and a steady-state deviation between the time series measuring force and the time series target force is larger than a predetermined threshold value, the processor is configured to display a dialogue box in the second screen for the application of the integrator.

5. The robot control device according to claim 2, wherein the processor is configured to adjust a gain of the detection of the time series measuring force of the force detector so as to reduce overshoot of the time series measuring force for the specific control direction to which the integrator is applied, and
the processor adjusts the gain by adjusting the integral gain of the integrator.

6. The robot control device according to claim 1, wherein, when the integrator is applied, the processor is configured to obtain the difference by subtracting the time series measuring force from the time series target force,
the processor is configured to input the difference into the integrator,
the processor is configured to add the difference and an output of the integrator to create a force control output, and
the processor is configured to perform the force control with respect to a work based on the force control output by using the force detector.

7. The robot control device according to claim 6, wherein, when the robot is operated by executing the control program created in a state where the integrator is not applied and a steady-state deviation between the time series measuring force and the time series target force is larger than a predetermined threshold value, the processor is configured to display a dialogue box in the second screen for the application of the integrator.

8. The robot control device according to claim 6, wherein the processor is configured to adjust a gain of the detection of the time series measuring force of the force detector so as to reduce overshoot of the time series measuring force for the specific control direction to which the integrator is applied, and
the processor adjusts the gain by adjusting the integral gain of the integrator.

9. The robot control device according to claim 1, wherein, when the robot is operated by executing the control program created in a state where the integrator is not applied and a steady-state deviation between the time series measuring force and the time series target force is larger than a predetermined threshold value, the processor is configured to display a dialogue box in the second screen for the application of the integrator.

10. The robot control device according to claim 1, wherein the processor is configured to adjust a gain of the detection of the time series measuring force of the force detector so as to reduce overshoot of the time series measuring force for the specific control direction to which the integrator is applied, and
the processor adjusts the gain by adjusting the integral gain of the integrator.

11. A robot system comprising:
a robot having a force detector;
an input device through which an instruction is input;
a display having a switchable plurality of screens, the switchable plurality of screens including a first screen and a second screen, the first screen being divided into a first area and a second area, the first area being configured to display a plurality of operation objects corresponding to operations using force control of the robot, the second area being configured to display an object operation flow corresponding to a robot operation flow of the robot;
a memory configured to store a program and a time series target force of the force detector corresponding to the robot operation flow of the robot; and
a processor is configured to execute the program so as to:
cause the first area of the display to display the plurality of operation objects and the conditional operation object;

receive an input as the instruction via the input device; select an object of the plurality of operation objects and the conditional operation object based on the input;

cause the second area of the display to display the selected object as a part of the object operation flow;

repeat the receiving of the input, the selecting of the object, and the causing of the second area to display the selected object a predetermined number of times to complete the object operation flow;

convert the completed object operation flow into a control program, the control program being configured to control the operations of the robot;

execute the control program to control the robot; detect a time series measuring force of the force detector during the execution of the control program;

cause the first area of the display to display the time series measuring force of the force detector and a selection for selecting whether an integrator is applied to a difference between the time series target force and the time series measuring force for a specific control direction among a plurality of control directions, an application of the integrator corresponding to integrating the difference;

receive a selection input as the instruction via the input device with respect to the selection;

cause the display to switch to display the second screen when the selection input corresponding to the application of the integrator; and receive an adjusting input via the input device for adjusting an integral gain of the integrator when a result of the execution of the control program is in a predetermined condition.

12. The robot system according to claim 11, wherein the processor is configured to independently select whether or not the integrator is applied to the difference for each of the plurality of control directions.

13. The robot system according to claim 12, wherein, when the integrator is applied, the processor is configured to obtain the difference by subtracting the time series measuring force from the time series target force, the processor is configured to input the difference into the integrator, the processor is configured to add the difference and an output of the integrator to create a force control output, and the processor is configured to perform the force control with respect to a work based on the force control output by using the force detector.

14. The robot system according to claim 12, wherein, when the robot is operated by executing the control program created in a state where the integrator is not applied and a steady-state deviation between the time series measuring force and the time series target force is larger than a predetermined threshold value, the processor is configured to display a dialogue box in the second screen for the application of the integrator.

15. The robot system according to claim 12, wherein the processor is configured to adjust a gain of the detection of the time series measuring force of the force detector so as to reduce overshoot of the time series measuring force for the specific control direction to which the integrator is applied, and the processor adjusts the gain by adjusting the integral gain of the integrator.

16. The robot system according to claim 11, wherein, when the integrator is applied, the processor is configured to obtain the difference by subtracting the time series measuring force from the time series target force, the processor is configured to input the difference into the integrator, the processor is configured to add the difference and an output of the integrator to create a force control output, and the processor is configured to perform the force control with respect to a work based on the force control output by using the force detector.

17. The robot system according to claim 16, wherein, when the robot is operated by executing the control program created in a state where the integrator is not applied and a steady-state deviation between the time series measuring force and the time series target force is larger than a predetermined threshold value, the processor is configured to display a dialogue box in the second screen for the application of the integrator.

18. The robot system according to claim 16, wherein the processor is configured to adjust a gain of the detection of the time series measuring force of the force detector so as to reduce overshoot of the time series measuring force for the specific control direction to which the integrator is applied, and the processor adjusts the gain by adjusting the integral gain of the integrator.

19. The robot system according to claim 11, wherein, when the robot is operated by executing the control program created in a state where the integrator is not applied and a steady-state deviation between the time series measuring force and the time series target force is larger than a predetermined threshold value, the processor is configured to display a dialogue box in the second screen for the application of the integrator.

20. The robot system according to claim 11, wherein the processor is configured to adjust a gain of the detection of the time series measuring force of the force detector so as to reduce overshoot of the time series measuring force for the specific control direction to which the integrator is applied, and the processor adjusts the gain by adjusting the integral gain of the integrator.

* * * * *